United States Patent
Anantha Padmanaban et al.

(10) Patent No.: US 10,270,760 B2
(45) Date of Patent: Apr. 23, 2019

(54) DOMAIN JOINED VIRTUAL NAMES ON DOMAINLESS SERVERS

(71) Applicant: Microsoft Technology Licensing, LLC, Redmond, WA (US)

(72) Inventors: Sai Sudhir Anantha Padmanaban, Redmond, WA (US); Lokesh Srinivas Koppolu, Redmond, WA (US); Andrea D'Amato, Kirkland, WA (US); Yi Zeng, Bothell, WA (US)

(73) Assignee: Microsoft Tehnology Licensing, LLC, Redmond, WA (US)

( * ) Notice: Subject to any disclaimer, the term of this patent is extended or adjusted under 35 U.S.C. 154(b) by 0 days.

(21) Appl. No.: 15/725,577

(22) Filed: Oct. 5, 2017

(65) Prior Publication Data

US 2018/0048636 A1 Feb. 15, 2018

Related U.S. Application Data

(62) Division of application No. 14/859,313, filed on Sep. 20, 2015, now Pat. No. 9,813,413.
(Continued)

(51) Int. Cl.
*G06F 21/41* (2013.01)
*H04L 29/06* (2006.01)
(Continued)

(52) U.S. Cl.
CPC ........ *H04L 63/083* (2013.01); *H04L 61/1511* (2013.01); *H04L 63/0807* (2013.01);
(Continued)

(58) Field of Classification Search
None
See application file for complete search history.

(56) References Cited

U.S. PATENT DOCUMENTS 6,338,064 B1   1/2002   Ault et al.
6,665,304 B2   12/2003  Beck et al.
(Continued)

FOREIGN PATENT DOCUMENTS

EP   2667318 A1   11/2013

OTHER PUBLICATIONS

"Active Directory", retrieved from <<https://en.wikipedia.org/wiki/Active_Directory>>, Jun. 24, 2015, 13 pages (submitted in related U.S. Appl. No. 14/859,313, filed Sep. 20, 2015).
(Continued)

*Primary Examiner* — Venkat Perungavoor
(74) *Attorney, Agent, or Firm* — Ogilvie Law Firm

(57) ABSTRACT

Services from domainless machines are made available in a security domain under a virtual name. Each machine is not joined to the domain but can reach a security domain controller. The controller controls at least one security domain using an authentication protocol, such as a modified Kerberos protocol. One obtains a set of security domain credentials, generates a cluster name secret, gives the cluster a virtual name, and authenticates the machines to the domain controller using these items. In some cases, authentication uses a ticket-based protocol which accepts the cluster name secret in place of a proof of valid security domain membership. In some, the domain controller uses a directory service which is compatible with an active directory service; the cluster virtual name is provisioned as an account in the directory service. The cluster virtual name may concurrently serve clients on different security domains of the directory service.

20 Claims, 5 Drawing Sheets

Related U.S. Application Data

(60) Provisional application No. 62/205,686, filed on Aug. 15, 2015.

(51) Int. Cl.
  *H04L 29/12* (2006.01)
  *H04L 9/32* (2006.01)
  *H04L 29/08* (2006.01)
  *H04L 29/14* (2006.01)

(52) U.S. Cl.
  CPC .. *H04L 63/0815* (2013.01); *G06F 2221/2145* (2013.01); *H04L 67/10* (2013.01); *H04L 69/40* (2013.01)

(56) References Cited

U.S. PATENT DOCUMENTS

| | | | |
|---|---|---|---|
| 7,418,507 | B2 | 8/2008 | Kruse |
| 8,190,774 | B2 | 5/2012 | Bolan et al. |
| 8,336,047 | B2 | 12/2012 | Van Hensbergen |
| 8,528,057 | B1* | 9/2013 | Garrett ............ H04L 63/0815 380/201 |
| 8,615,791 | B1 | 12/2013 | Cordell et al. |
| 8,627,431 | B2 | 1/2014 | Padmanaban et al. |
| 2003/0115267 | A1* | 6/2003 | Hinton ............. G06F 21/41 709/204 |
| 2003/0131246 | A1 | 7/2003 | Reeves et al. |
| 2004/0122946 | A1 | 6/2004 | Hu et al. |
| 2004/0215735 | A1 | 10/2004 | Nakahara et al. |
| 2007/0157292 | A1 | 7/2007 | Danner et al. |
| 2012/0030673 | A1 | 2/2012 | Sakamoto |
| 2014/0331297 | A1 | 11/2014 | Innes et al. |
| 2015/0236902 | A1 | 8/2015 | Alam et al. |

OTHER PUBLICATIONS

"Domainless groups", retrieved from <<https://www-01.ibm.com/support/knowledgecenter/ssw_aix_61/com.ibm.aix.security/domainlessgroups.htm>>, no later than Aug. 7, 2015, 2 pages (submitted in related U.S. Appl. No. 14/859,313, filed Sep. 20, 2015).

"Integrated Windows Authentication", retrieved from <<https://en.wikipedia.org/wiki/Integrated_Windows_Authentication>>, Jul. 16, 2014, 3 pages (submitted in related U.S. Appl. No. 14/859,313, filed Sep. 20, 2015).

"Apache virtual hosts vs. alias, what is better?", retrieved from <<http://serverfault.com/questions/198344/apache-virtual-hosts-vs-alias-what-is-better>>, Nov. 4, 2010, 2 pages (submitted in related U.S. Appl. No. 14/859,313, filed Sep. 20, 2015).

"Authentication", retrieved from <<https://en.wikipedia.org/wiki/Authentication>>, Sep. 3, 2015, 10 pages (submitted in related U.S. Appl. No. 14/859,313, filed Sep. 20, 2015).

"What is cluster name object (CNO)?", retrieved from <<http://searchwindowsserver.techtarget.com/definition/cluster-name-object-CNO>>, no later than Sep. 4, 2015, 4 pages (submitted in related U.S. Appl. No. 14/859,313, filed Sep. 20, 2015).

"Domain controller", retrieved from <<https://en.wikipedia.org/wiki/Domain_controller>>, Aug. 20, 2015, 3 pages (submitted in related U.S. Appl. No. 14/859,313, filed Sep. 20, 2015).

"Domain name", retrieved from <<https://en.wikipedia.org/wiki/Domain_name>>, Aug. 31, 2015, 7 pages (submitted in related U.S. Appl. No. 14/859,313, filed Sep. 20, 2015).

"Domain Name System", retrieved from <<https://en.wikipedia.org/wiki/Domain_Name_System>>, Aug. 31, 2015, 16 pages (submitted in related U.S. Appl. No. 14/859,313, filed Sep. 20, 2015).

"Domains: Active Directory", retrieved from <<https://technet.microsoft.com/en-us/library/Cc780856(v=WS.10).aspx>>, no later than Sep. 4, 2015, 2 pages (submitted in related U.S. Appl. No. 14/859,313, filed Sep. 20, 2015).

"Hostname", retrieved from <<https://en.wikipedia.org/wiki/Hostname>>, Sep. 3, 2015, 3 pages (submitted in related U.S. Appl. No. 14/859,313, filed Sep. 20, 2015).

"Kerberos (protocol)", retrieved from <<https://en.wikipedia.org/wiki/Kerberos_(protocol)>>, Aug. 14, 2015, 7 pages (submitted in related U.S. Appl. No. 14/859,313, filed Sep. 20, 2015).

Mark Walla, "Kerberos Explained", retrieved from <<https://msdn.microsoft.com/en-us/library/Bb742516.aspx>>, May 2000, 6 pages (submitted in related U.S. Appl. No. 14/859,313, filed Sep. 20, 2015).

"Cluster Name", retrieved from <<https://msdn.microsoft.com/en-us/library/aa371733(v=vs.85).aspx>>, no later than Sep. 4, 2015, 1 page (submitted in related U.S. Appl. No. 14/859,313, filed Sep. 20, 2015).

"Creating a new forest: Active Directory", retrieved from <<https://technet.microsoft.com/en-us/library/cc755450(v=ws.10).aspx>>, Jan. 21, 2005, 2 pages (submitted in related U.S. Appl. No. 14/859,313, filed Sep. 20, 2015).

"RFC 1510—The Kerberos Network Authentication Service (V5)", retrieved from <<https://tools.ietf.org/html/rfc1510>>, Sep. 1993, 112 pages (submitted in related U.S. Appl. No. 14/859,313, filed Sep. 20, 2015).

"RFC 4120—The Kerberos Network Authentication Service (V5)", retrieved from <<https://tools.ietf.org/html/rfc4120>>, Jul. 2005, 139 pages (submitted in related U.S. Appl. No. 14/859,313, filed Sep. 20, 2015).

"Security domain", retrieved from <<https://en.wikipedia.org/wiki/Security_domain>>, Nov. 14, 2014, 1 page (submitted in related U.S. Appl. No. 14/859,313, filed Sep. 20, 2015).

"What is a difference between security token and security ticket?", retrieved from <<http://stackoverflow.com/questions/14200579/what-is-a-difference-between-security-token-and-security-ticket>>, Jan. 2013, 2 pages (submitted in related U.S. Appl. No. 14/859,313, filed Sep. 20, 2015).

"Virtual hosting", retrieved from <<https://en.wikipedia.org/wiki/Virtual_hosting>>, Aug. 1, 2015, 3 pages (submitted in related U.S. Appl. No. 14/859,313, filed Sep. 20, 2015).

"What is the difference between a hostname and a domain name", retrieved from <<http://support.suso.com/supki/What_is_the_difference_between_a_hostname_and_a_domain_name>>, Copyright 2004-2009, 1 page (submitted in related U.S. Appl. No. 14/859,313, filed Sep. 20, 2015).

"What is the difference between virtual server and alias in apache for php", retrieved from <<http://stackoverflow.com/questions/5763732/what-is-the-difference-between-virtual-server-and-alias-in-apache-for-php>>, Apr. 2011, 1 page (submitted in related U.S. Appl. No. 14/859,313, filed Sep. 20, 2015).

"International Search Report and Written Opinion Issued in PCT Application No. PCT/US2016/046965", dated Oct. 19, 2016, 12 Pages. (submitted in related U.S. Appl. No. 14/859,313, filed Sep. 20, 2015).

"A Gentle Introduction to Grid Computing and Technologies", Buyya et al., Computer Society of India (2005) (mailed by USPTO in related U.S. Appl. No. 14/859,313, filed Sep. 20, 2015).

"Multi-site Virtual Cluster: A User-Oriented Distributed Deployment and Management Mechanism for Grid Computing Environments", Hirofuchi, et al., IEEE (2008) (mailed by USPTO in related U.S. Appl. No. 14/859,313, filed Sep. 20, 2015).

\* cited by examiner

DOMAIN JOINED VIRTUAL NAMES ON DOMAINLESS SERVERS

RELATED APPLICATIONS

To the extent permitted by law, the present application hereby claims priority to, and hereby incorporates by reference the entirety of, U.S. patent application Ser. No. 14/859,313 filed Sep. 20, 2015, and U.S. provisional patent application 62/205,686 filed Aug. 15, 2015.

BACKGROUND

A failover cluster is a group of server computers that work together to maintain high availability of applications and services. The server computers may also be referred to as "servers" or as "nodes". If one of the nodes fails, then another node in the cluster can take over its workload with little or no downtime, a process which is known as "failover".

In some computing architectures, a group of computers that share a network resource database and have a common security policy are called a "domain". A domain may have a domain controller, sometimes called a "primary domain controller" (PDC) which is a computer that manages the resource and user access for the entire domain. One or more backup domain controllers may also be present. Other computers in the domain are workstations or servers that provide computational resources to domain users, after domain authentication or another authentication protocol establishes that the users have permission to access the computers in the domain. A domain administrator may manage access using administrative software and security policies.

SUMMARY

Some embodiments are directed to the technical activity of cluster authentication. Some embodiments are directed to the related technical activity of making services available from one or more domainless machines in a security domain under the guise of a virtual name through the use of an innovative authentication protocol. Other technical activities pertinent to teachings herein will also become apparent to those of skill in the art.

Some embodiments help make an authenticated cluster available. At least two servers form a cluster. Each server is not joined to a security domain but networked such that it can reach a security domain controller. The security domain controller controls at least one security domain using an authentication protocol. The innovation obtains a set of security domain credentials, generates a cluster name secret, gives the cluster a virtual name, and authenticates the servers to the domain controller as a cluster using the security domain credentials, the cluster name secret, and the cluster virtual name. In some cases, the authenticating uses a ticket-based authentication protocol which accepts the cluster name secret in place of a proof of valid security domain membership. In some, the domain controller uses a directory service which is compatible with an active directory service.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Acronyms and Abbreviations

Figure 1:
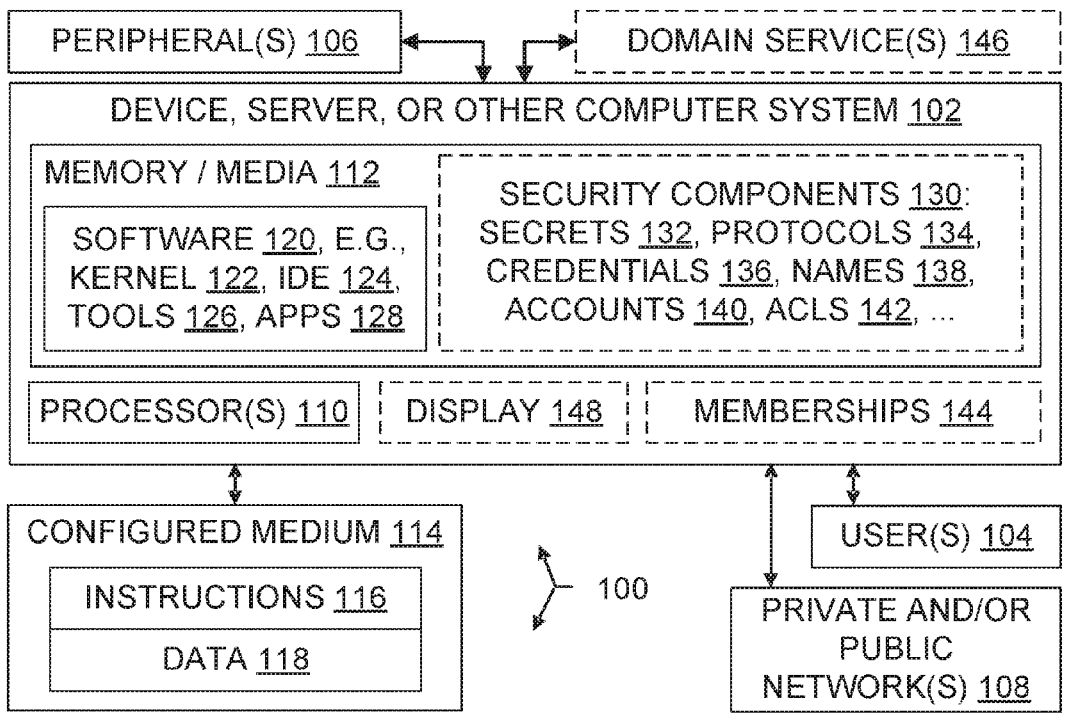
FIG. 1 is a block diagram illustrating a computer system having at least one processor and at least one memory which interact with one another under the control of software, and other items in an operating environment which may be present on multiple network nodes, and also illustrating configured storage medium (as opposed to a mere signal) embodiments.

Some acronyms and other abbreviations are defined below. Others may be defined elsewhere herein or require no definition to be understood by one of skill.

ACL: access control list
AD: Active Directory® (refers to software developed by Microsoft; Active Directory is a registered mark of Microsoft Corporation, and use of the AD abbreviation herein without the circled R notation "®" is not a waiver of any trademark or other rights)
ALU: arithmetic and logic unit
API: application program interface
CCNA: create cluster name account
clusapi: cluster API
CNO: cluster name, or cluster name object
CD: compact disc
CPU: central processing unit
CSV: cluster shared volume(s)
DC: domain controller or domain control
DLL: dynamic link library
DNN: distributed network name
DNS: domain name services
DR: disaster recovery
DVD: digital versatile disk or digital video disc
FPGA: field-programmable gate array
FPU: floating point processing unit
GPU: graphical processing unit
GUI: graphical user interface
GUID: globally unique identifier
GUM: global update manager
HKLM: HKEY_LOCAL_MACHINE
IDE: integrated development environment, sometimes also called "interactive development environment"
IP: internet protocol, or internet protocol address LAN: local area network
LDAP: lightweight directory access protocol
NAS: network-attached storage
NT: new technology, as in NTFS, NTLM
NTFS: NT file system
NTLM: NT LAN manager security protocol
OS: operating system
PS: PowerShell (command line shell and/or scripting language; Windows PowerShell® is a mark of Microsoft Corporation)
RAM: random access memory
RHS: resource hosting subsystem
ROM: read only memory
SID: security identifier
SMB: server message block
SPN: service principal names
SRV: server service (server side of SMB)
TCP: transmission control protocol
UI: user interface
URL: uniform resource locator
VCO: virtual computer object, e.g., with file server name
VIP: Virtual IP
WMI: windows management instrumentation Overview Traditionally, virtual names that belong to a failover cluster are hosted on a set of machines that are also domain joined. In retrospect, however, this creates management complexity. It also activates group policy on those machines. Some embodiments described herein provide or use domain joined virtual names that have network and directory service presence, hosted on a cluster of domainless machines that can discover an authentication domain (a.k.a., a security domain). Many of the examples herein use Microsoft Active Directory® software and/or services, but upon investigation one of skill will understand trade-offs and adaptations involved in using other software instead, together with some or all of the features described herein. One of skill may for example consider alternatives using DNS with LDAP and an appropriately modified version of Kerberos or other authentication software. Such virtual names serve as connection endpoints for highly available file server services while imparting the full benefits of a secure (e.g., Kerberos) authenticated connection and subsequent authorization. An administrator of such a deployment is relieved of the efforts involved in manually joining machines to a domain (e.g., an Active Directory® domain) and can hide many implementation complexities from users outside the cluster.

File server deployments in systems using Windows Server® and/or StorSimple® software or services (marks of Microsoft Corporation) can be made highly available in part by deploying virtual names on failover clusters that serve as server endpoints. Those virtual names provide network presence through Domain Name Services (DNS) and support Kerberos authentication through Active Directory® (AD) integration. However for those file servers to be integrated in a conventional AD context the machines composing the cluster have to be domain joined. This creates an administrative complexity for the deployment, and can expose the cluster to group policy management, with the overhead and complexity that involves. It also creates difficulties in locking down the machines from console access through domain credentials.

Some embodiments described herein maintain the same functionality exposed by the virtual names while relaxing the requirement that the machines of the cluster be domain joined. Thus, with some examples it is possible to stand up a domainless cluster that can subsequently host virtual names which provide network presence and Kerberos authentication.

One of skill will acknowledge it is sometimes possible to perform a weaker authentication against the virtual names through the NTLM security protocol. However, that approach is much weaker compared to Kerberos and is not recommended by some administrators or guidelines. Also, it cannot be used in some authorization scenarios typically invoked by domain users.

The technical character of embodiments described herein will be apparent to one of ordinary skill in the art, and will also be apparent in several ways to a wide range of attentive readers. For instance, some embodiments address technical activities such as cluster formation, authentication, and/or security domain management. Improvements to the operation of computers themselves are thus provided. In particular, in the United States, any claim interpretation which makes a claim to innovation described herein non-statutory as directed solely to an abstract idea is not a reasonable interpretation.

Reference will now be made to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

"Authentication" is a process, procedure, and/or protocol for confirming, verifying, or validating an identity ("confirming", "verifying", and "validating" are used interchangeably herein). Authentication differs from identification, in that identification merely states or indicates an identity, whereas authentication enquires into the accuracy of a stated or indicated identity. Authentication also differs from authorization, in that authorization enquires into whether an action or access is permitted to a particular identity in a particular context. Informally, identification is who you say you are, authentication checks whether you are actually who you say you are, and authorization checks whether you are permitted to do what you are trying to do.

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

A "cluster" is a set of two or more network-connected computers ("nodes") that work together under the control of clustering software to perform a given task or job. Each node contains at least a processor, memory operably connected to the node processor(s), and a network card or other device for communication with at least one other node. Within the cluster, the nodes communicate with one another over a network, such as a fast Local Area Network (LAN) or an interconnect. To application software outside the cluster, the cluster appears to be a single machine. Items such as a cluster name, cluster secret, and cluster domain pertain to the cluster as a whole, rather than being limited to a particular node, even if an implementation designates a particular node of the cluster at a given point. Such node-specific designations are often subject to change, and are not visible outside the cluster except perhaps to system or network administrators. For instance, a cluster name is the name of the cluster as a whole, not the name of any particular node; a cluster secret is a secret held by the cluster as a whole, even though it may reside only in a particular designated node; and a cluster domain is a domain to which the cluster as a whole belongs, even if all communications in the domain go through a particular designated node.

"Code" means processor instructions, data (which includes constants, variables, and data structures), or both instructions and data.

A service is "compatible with active directory services" when it is an Active Directory® service or is functionally interchangeable with an Active Directory® service, the Active Directory® service being a service which predates the present application's priority date unless expressly stated otherwise.

"Computationally" means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

A computational service or server is "highly available" (HA) or has "high availability" when it is operation for more than a specified threshold of the desired time and/or provides more than a specified threshold of the desired performance. The specified threshold for HA is normally at least 90% of the maximum time/performance that is theoretically available if nothing interferes with operation of the service or server. Thresholds may also be higher, e.g., "five nines availability" means the service/server is available 99.999% of the time.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

"Kerberos" means any software, automated service, and/or protocol which has at least one of the following characteristics: (a) it conforms with Internet Engineering Task Force (IETF) Request for Comments (RFC) 1510; (b) it conforms with IETF RFC 4120; (c) it is commercially available under the name "Kerberos" from the Kerberos Consortium and/or at least one member thereof, the Kerberos Consortium being an organization formed in 2007 with the participation of Massachusetts Institute of Technology (MIT), Oracle, Apple, Google, Microsoft, and others; or (d) it is recognized in the industry as consistent with and/or derived from one or more versions of the services, protocols, and/or software implementations that were developed, at least in part by MIT, under the "Kerberos" name.

"Kernels" include operating systems, hypervisors, virtual machines, BIOS code, and similar hardware interface software.

"Linguistically" means by using a natural language or another form of communication which is often employed in face-to-face human-to-human communication. Communicating linguistically includes, for example, speaking, typing, or gesturing with one's fingers, hands, face, and/or body.

A "logical processor" or "processor" is a single independent hardware thread-processing unit, such as a core in a simultaneous multithreading implementation or a device controller chip or chipset. As another example, a hyper-threaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, peripheral device control, and so on.

A "multiprocessor" computer system is a computer system which has multiple logical processors. Multiprocessor environments occur in various configurations, some of which are clusters. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

"Optimize" means to improve, not necessarily to perfect. For example, it may be possible to make further improvements in a program which has been optimized.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Procedure" means a function, a routine, an exception handler, an interrupt handler, or another block of instructions which receives control via a jump and a context save. A context save pushes a return address on a stack or otherwise saves the return address, and may also save register contents to be restored upon return from the procedure. A procedure may have a return value, or may not; procedures with return values are sometimes called "functions". However, the term "function" may also be used interchangeably with "procedure", so when the presence or absence of a return value is significant herein, that presence or absence is indicated, e.g., by stating that a return value is present, or by indicating a return value or the use of a return value.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Program" is used broadly herein, to include applications, kernels, drivers, interrupt handlers, firmware, state machines, libraries, and other code written by programmers (who are also referred to as developers).

A "security domain" encloses managed objects in a computing environment, such as user accounts, permission groups, and/or computers, which share a set of security policies. A given security policy defines how domain resources such as files or computers can be accessed, configured, and used. In some environments, trust relationships exist between security domains. Thus, when security domain B trusts security domain A, an identity authenticated in A by use of particular credentials (username, password, biometric value, etc.) will be treated as authentic in B, without presenting those credentials in B. In general, a given security domain may span multiple physical locations at different geographical sites, and a given site may include computers and users that belong to various security domains. A security domain may have a name, which in some cases may be a domain name registered in the Domain Name System (DNS), but security domains and DNS domains are not necessarily the same in a given computing environment. Security domains define security policy boundaries whereas DNS domains define registered name boundaries.

As used herein, the term "set" means a non-empty set unless explicitly stated otherwise. When a set is empty, it will be described as an "empty set" and when a set may be either empty or non-empty it will be described as a "potentially empty set" herein.

"Ticket" and "token" are often used interchangeably in the industry, but a distinction is also made by those of skill in the art in some contexts, including herein. As used herein, a ticket is an example of a token. A token is a digital data structure which represents the result of an authentication and/or an authorization. A ticket is a digital data structure which represents the result of an authentication within a security domain.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. For example, certain familiar devices perform balance calculations to maintain their balance; some examples include some mobile robots and some wheeled personal mobility devices. These devices are not part of the embodiments described herein but they illustrate the point that technical effects are provided by technical components, not by mere mental steps. Balance calculations simply cannot be performed rapidly enough by mental steps or by paper and pencil to provide the balance that is present in many mobile robots or wheeled personal mobility devices. The technical effect of having a dynamically balanced device is thus provided by technical components which include a processor and a memory interacting with balance control software. Likewise, in the United States, any claim interpretation which makes a claim to innovation described herein non-statutory as directed solely to mental steps is not a reasonable interpretation.

Throughout this document, use of the optional plural "(s)", "(es)", or "(ies)" means that one or more of the indicated feature is present. For example, "processor(s)" means "one or more processors" or equivalently "at least one processor". The symbol "/" is used herein as an abbreviation for "and/or", e.g., "permitted/required" means permitted and/or required.

Procedures may be referred to herein with a full signature, e.g., "void foo1(x: int)" or the like. They may also be referred to in shorter form, e.g., as "foo1( )" or as "foo".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case, and any interpretation of a claim that covers a signal per se, is not a reasonable interpretation.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se. In the United States, any claim interpretation which makes a claim to innovation described herein non-statutory as directed to signals per se is not a reasonable interpretation.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or a local screen, or on a smart phone, for example, or it may be generated from a web server and sent to a client. The user interface may be generated as part of a service and it may be integrated with other services, such as social networking services or cloud computing services. A given operating environment may also include devices and infrastructure which support these and other user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment may include devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se. Any claim interpretation to the contrary in the United States is not reasonable.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, software 120 includes one or more kernels 122, zero or more integrated development environments 124, zero or more software development tools 126, and zero or more applications 128. Software 120 has code such as source files and object files, which typically includes procedures and data structures. Software development tools 126 such as compilers, debuggers, linkers, and profilers assist with software development by producing and/or transforming code. An integrated development environment (IDE) 124 provides a developer with a set of coordinated software development tools 126 in some environments. However, teachings herein are also applicable with technical endeavors outside the field of software development per se.

In some cases, a system 102 includes security components 130 which assist with the identification, authentication, verification, protection, or other security-related characteristics of the system. Some examples include secrets 132 such as passwords, passphrases, PINs, tokens, keys, and/or certificates or combinations thereof. Some include protocols 134, in the form of software and/or hardware which is configured to operate according to specified operations, formats, and value criteria. Some examples include credentials 136, in the form of secrets 132 which are digitally signed or otherwise verifiable as valid, as well as names 138, for example. Names 138 may be implemented as strings, integers, GUIDs, or URLs, for example. Some examples include accounts 140, in the form of account names, account secrets, and/or account credentials, for an account that is managed at least in part by one or more other systems. Some examples include access control lists (ACLs) 142 and/or other access permission indicators.

Some systems are members of a cluster, a security domain, a DNS domain, a set of trusted computers, a private cloud, a server farm, a LAN, and/or some other computational entity. These possibilities are noted generally in FIG. 1 as memberships 144. Some systems have access to domain services 146, such as security domain services, and in particular security domain directory services.

The software 120, security components 130 if present, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

In addition to processors 110 (CPUs, ALUs, FPUs, and/or GPUs), memory/storage media 112, display(s) 148, and battery(ies), an operating environment may also include other hardware, such as buses, power supplies, wired and wireless network interface cards, and accelerators, for instance, whose respective operations are described herein to the extent not already apparent to one of skill. The display 148 may include one or more touch screens, screens responsive to input from a pen or tablet, or screens which operate solely for output. As indicated, however, a given system 102 does not necessarily have a display, and may also have only a display which is removable and/or shared with other devices, One of skill will appreciate that the foregoing aspects and other aspects presented herein under "Operating Environments" may also form part of a given embodiment. This document's headings are not intended to provide a strict classification of features into embodiment and non-embodiment feature classes.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 3 is provided for convenience; inclusion of an item in FIG. 3 does not imply that the item, or the described use of the item, was known prior to the current innovations.

Systems

Figure 2:
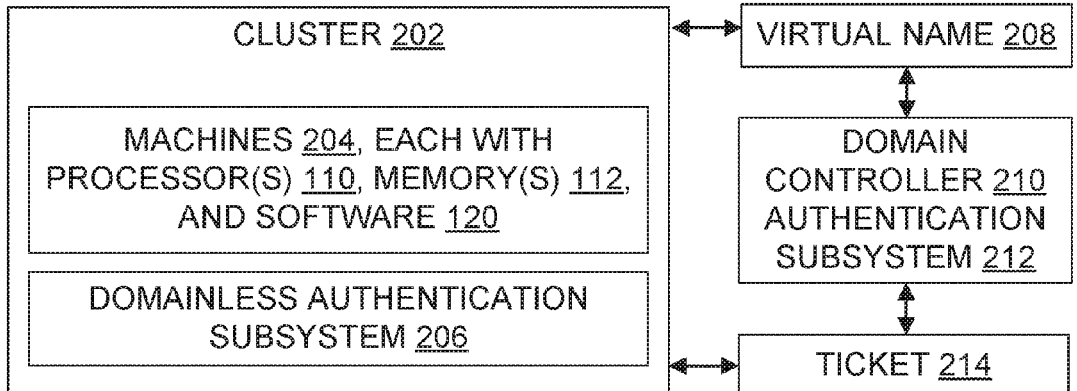
FIG. 2 is a block diagram illustrating a cluster.
Figure 3:
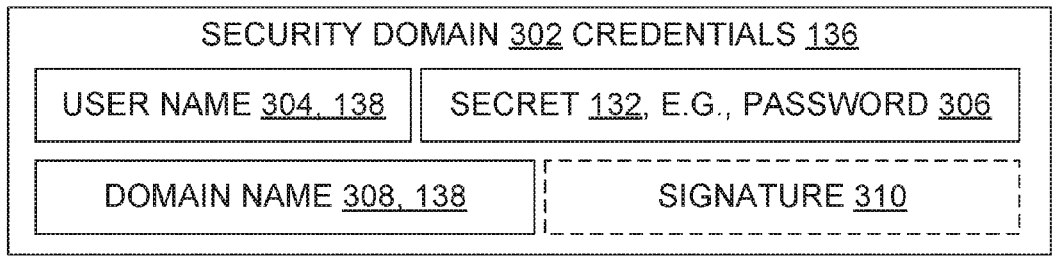
FIG. 3 is a block diagram illustrating security domain credentials.

Turning to FIGS. 2 and 3, in some examples a cluster 202 includes two or more machines 204. Machines 204 are examples of systems 102. The term "machine" refers to a system 102 having no more than one chassis and motherboard, e.g., a smartphone, tablet, laptop, desktop, smart IoT appliance, and server blade are each a machine. Some clusters 202 also have a domainless authentication subsystem 206, namely, a subsystem which permits machines 204 of the cluster to be authenticated for use within a security domain through a virtual name, even though the machines 204 themselves do not belong to the security domain. For clarity, note that the domain controller may also have an authentication subsystem, which is designated by 212.

In some embodiments, a cluster 202 apparatus includes a plurality of processors 110, at least one memory 112 in operable communication with the processors, and a domainless authentication subsystem (DAS) 206. The DAS 206 includes software 120 executable by at least one processor 110 using the memory 112 to (a) accept security domain credentials 136 for a user 104, (b) accept a name 138 to be used as a virtual name 208, (c) obtain a secret 132 for the virtual name, and (d) present the credentials, name, and proof of knowledge of the secret to a security domain controller 210, thereby impersonating a security domain member and causing a directory service 146 associated with the security domain controller to provision a computer object associated with the virtual name in the directory service.

In some embodiments, the security domain credentials 136 for a security domain 302 include a user name 304, password 306, and domain name 308 for the user. The credentials may be digitally signed 310 to support tamper detection and/or authentication. In some embodiments, the secret is generated by the domainless authentication subsystem.

Some embodiments include the security domain controller 210 as well as the cluster 202. In some of these, and in others as well, the domain controller 210 includes a ticket-based authentication subsystem 212 configured with code that upon execution by a processor of the domain controller decrypts incoming service tickets 214 with a secret known to both the domain controller and to a machine or other entity which seeks membership in a domain controlled by the domain controller. The secret may be, for instance, a password, passphrase, PIN, or other secret 132 known to both the domain controller and to the machine or other entity.

In some embodiments, machines 204 in the cluster (e.g., servers) are not domain joined (i.e., are not members of the domain), but do have access to security domain services 146 over a network 108.

In some embodiments, two virtual names 208 on a single machine 204 in the cluster 202 each serve a respective client 102 and each said client is in a different security domain 302.

Some embodiments are described in the context of a failover cluster 202 but may also be applied to a single machine 204 which is not a cluster.

Some embodiments operate as follows to stand up a domain joined virtual name on a "domainless" (having no security domain membership) cluster:
1. Accept domain credentials (user name, password and domain name) 136 for a user.
2. Accept the name to be used as the virtual name.
3. Generate a random password for the virtual name.
4. Impersonate a domain member using these credentials, and provision a computer object associated with the virtual name in Active Directory® data. The embodiment may also set various attributes on the object, such as password, Service Principal Names (SPNs), and DNSHostName.

Since the underlying operating system 122 of the machine to be used under the virtual name is not domain joined, the logon sessions on the machine will not have security domain credentials. This would cause failure of incoming Kerberos authentication on connections to the machine from clients if conventional technology were used. In such an environment, the Kerberos security package in a subsystem 212 can be enhanced to decrypt incoming service tickets 214 with a password 306 that is known to both the security domain controller 210 and to the machine 204 itself. (When the underlying operating system and the machine are both already domain joined to the same corresponding security domain and/or pre-existing cross-domain trust is invoked, Kerberos may already exhibit the correct decrypt behavior). This password is the one generated in step 3 above, which will be plumbed as an extra credential to the machine logon session, as it is the one that is set on the computer object. In some situations, a machine being joined to a security domain is not necessarily sufficient for conventional Kerberos to authenticate; it may be required that the machine's own security domain and the target security domain be the same security domain. Hence, in some examples Kerberos is enhanced to accept extra credentials when the conventional non-enhanced Kerberos cannot authenticate. Similar considerations apply when a host machine's security domain doesn't use Kerberos authentication.

In some examples, machines 204 in a cluster do not have to be security domain joined to be used securely by clients 612. Machine 204 access to security domain services 146 over the network to impersonate security domain membership with a virtual name is a sufficient alternative with the teachings herein. In some examples, virtual names on the same machine (or cluster) can serve clients on different security domains, e.g., different Active Directory® domains and/or forests.

Some teachings herein may be implemented to enhance NAS technology. For instance, StorSimple® technology may benefit from teachings here as part of a NAS feature on a physical appliance 102.

In view of the foregoing, some embodiments provide a computer system 102 with a logical processor 110 and a memory medium 112 configured by circuitry, firmware, and/or software to provide technical effects such as domain joined virtual names on domainless servers 616 as described herein.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, a local interconnect network interface, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Many embodiments operate in a "cloud" computing environment and/or a "cloud" storage environment, namely, one in which networked computing services are not owned but are provided on demand. For example, clusters 202 and clients 612 may be in a networked cloud.

Processes

Figure 4:
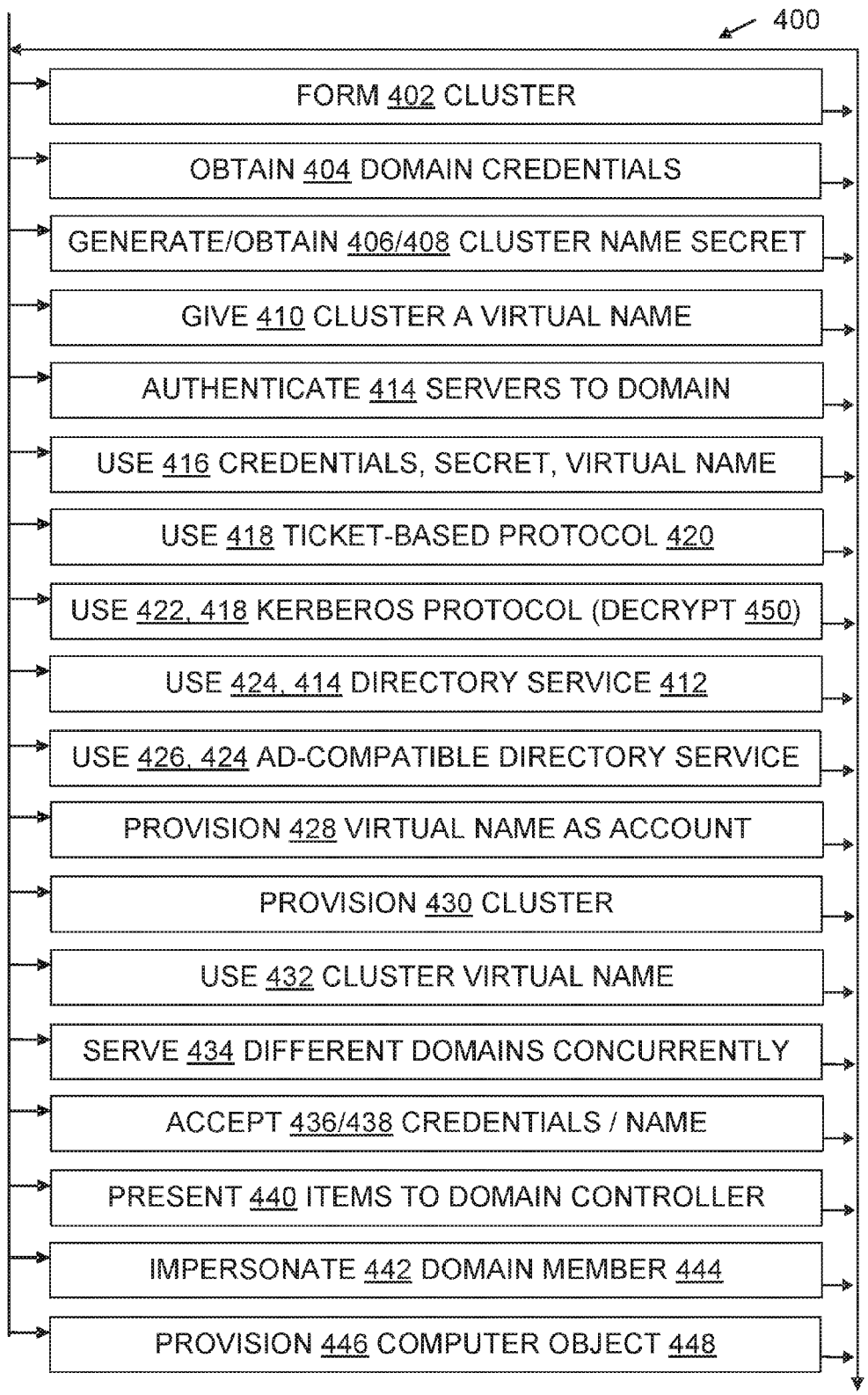
FIG. 4 is a flow chart illustrating aspects of some process and configured storage medium embodiments.

FIG. 4 illustrates some process embodiments in a flowchart 400. Technical processes shown in the Figures or otherwise disclosed may be performed in some embodiments automatically, e.g., by a software under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 4. Steps may be performed serially, in a partially overlapping manner, or fully in parallel. The order in which flowchart 400 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments use and/or provide a process to help make an authenticated cluster available, including forming 402 at least two servers 616 into a cluster 202. Each server includes at least a logical processor, and a memory in operable communication with the logical processor. Each server is not joined to a security domain but is networked such that each server can reach a domain controller service 146. Some examples of services 146 include Active Directory® Federation Services (ADFS), Azure™ Active Directory® (AAD), OAuth (open standard for authorization), Oath Challenge Response Algorithm (OCRA), LDAP, and Kerberos (which has various implementers), among others. The domain controller controls at least one security domain that authenticates at least one account type using a ticket-based authentication protocol. In some cases, the account type is selected from a group including computer account(s) (which typically shows that a computer 102 is a valid security domain member), security group(s), and user account(s) (which typically shows user is a valid security domain user).

This process also includes obtaining 404 a set of security domain credentials, generating 406 or otherwise obtaining 408 (e.g., reading from a secure file or a secure keyboard) a cluster name secret, and giving 410 the cluster a virtual name. In some cases, the virtual name is tied to the security domain credentials, while in others it is tied to other domain credentials, such as a random (or specific) user's credentials. This process also includes authenticating 414 the servers to the domain controller directory service, at least in part by using 416 the security domain credentials, the cluster name password, and the cluster virtual name.

In some examples, the cluster name secret is a password and the authenticating 414 uses 418 a ticket-based authentication protocol 134, 420 which accepts the cluster name password in place of a proof of valid security domain membership. Enhanced Kerberos as taught herein provides one such protocol 420. That is, in some examples the authenticating uses 422 a Kerberos protocol implemented by software that has been enhanced to accept the cluster name password. In others, it uses a different authentication protocol.

In some examples, the process uses 424 a directory service 412, which is an example of a domain service 146. In some examples, the domain controller directory service used 426 is compatible with an active directory service, while in others it is not.

In some examples, the process includes provisioning 428 the cluster virtual name as an account in a directory service, while in others it does not. The virtual name may also be used 432 in other ways, e.g., during maintenance, upgrade, or debugging operations. The process may include provisioning 430 the cluster as a file server, generally, or as a high availability file server.

In some examples, the authenticating uses a ticket-based authentication protocol which accepts proof of knowledge of the cluster name secret in place of a proof of valid security domain membership. That is, some embodiments allow non-passwords, including higher security options, as proof of knowledge of the secret. Some examples include one-time passwords based on a shared secret, symmetric shared secrets, and asymmetric encryption options such as public key cryptography, and may include one or more of signing, encrypting, or hashing. Other examples will also be apparent to one of skill in the art in view of the teachings herein.

In some examples, the process includes using the cluster virtual name to concurrently serve 434 clients on different security domains of the domain controller directory service. For example, consider a scenario in which organization one has computing infrastructure that includes cluster nodes in certificate based clusters. Suppose organization one acquires or merges with organizations two and three. It could be beneficial for organization one domain joined cluster nodes to service file servers for organizations two and three. This is feasible, per the teachings herein, since a machine (e.g., a cluster node) could be security domain joined even though the virtual names are tied to different security domains.

Some processes include a node accepting 436 credentials and accepting 438 a name to use as a virtual name, e.g., from an administrator or other user 104. The accepted components 130 are presented 440 to a security domain controller with the virtual name, allowing the node to impersonate 442 a domain member 444 having the credentials in question. In some examples, if the computer object did not already exist, the domain controller may then provision 446 a computer object 448 accordingly, and publish it in a directory, making the node accessible to clients. To use the node, a client sends a ticket with the password, which the domain controller decrypts 450.

Although many examples herein refer to clusters, one of skill will understand that individual machines can also impersonate security domain members using credentials, a secret, and a virtual name as discussed. In some cases, such a machine is also joined to a different security domain. That is, the machine may belong conventionally to one security domain under one name and also impersonate belonging to another security domain using a (different) virtual name.

Configured Media

Some embodiments use or provide a computer-readable storage medium configured with data and with instructions that when executed 344 by at least one processor causes the processor(s) to perform a technical process for domain membership management.

Figure 5:
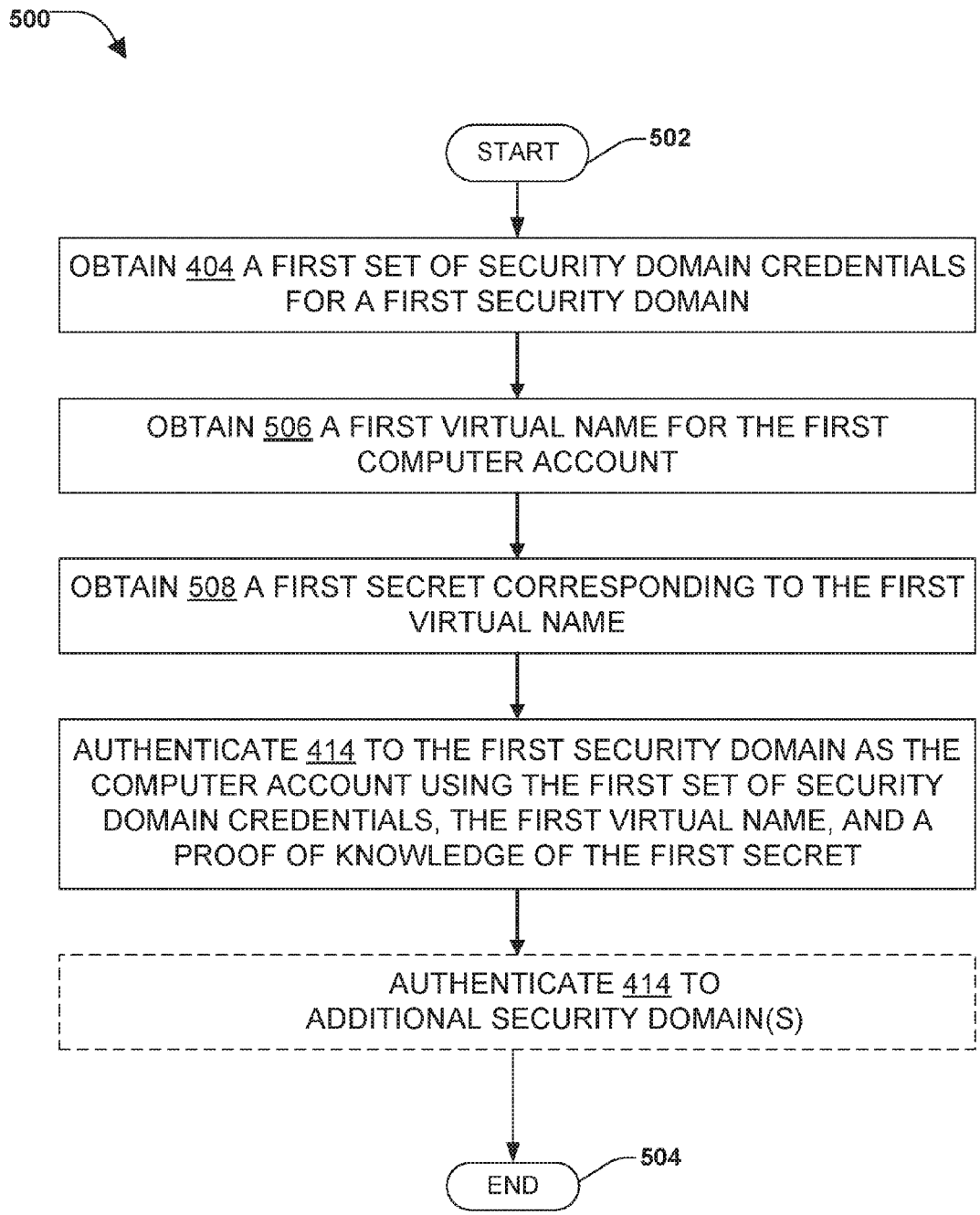
FIG. 5 is a flow chart further illustrating aspects of some processes in which machines of a cluster authenticate to one or more security domains.

FIG. 5 illustrates a process 500 for authenticating to one or more security domains. At 502 the process starts; since any steps of FIG. 5 and/or FIG. 4 may be combined so long as they are operable, 502 also may be understood as implicit in the processes whose steps are illustrated expressly in FIG. 4. Similarly, processes based on FIG. 4, as well as those based on FIG. 5, have an end 504. Continuing in FIG. 5, the illustrated process includes obtaining 404 a first set of security domain credentials for the first security domain; obtaining 506 a first virtual name for the first computer account, the first virtual name distinct from any other virtual name for the authenticating operating environment, the first virtual name also distinct from any computer name for the authenticating operating environment, the authenticating operating environment comprising at least a logical processor and a memory in operable communication with each other; obtaining 508 a first secret corresponding to the first virtual name; and authenticating 414 to the first security domain as the computer account using the first set of security domain credentials, the first virtual name, and proof of knowledge of the first secret. This process, like other processes taught herein, may be performed by software residing in a computer-readable storage medium.

In some examples, the authenticating operating environment is also authenticated 414 as a member of a second security domain, the first security domain being distinct from the second security domain. Security domains are distinct in some computing environments, for example, when they differ in any of the following: which security domain controller controls them, which security credentials are permitted/required/prohibited for membership, and/or which machines/virtual names/clusters are members. In some examples, the first security domain and second security domain have no pre-existing trust relationships.

Similarly, in some cases the authenticating operating environment is further authenticated to a third security domain using a third set of security domain credentials, a third virtual name, and a third proof of knowledge of a third secret, where the third set of security domain credentials are for a third security domain, the third virtual name is distinct from any other virtual name for the authenticating operating environment, the third virtual name is also distinct from any computer name for the authenticating operating environment, and the third secret corresponds to the third virtual name.

More generally, some embodiments include a configured computer-readable storage medium 112. Medium 112 may include disks (magnetic, optical, or otherwise), RAM, EEPROMS or other ROMs, and/or other configurable memory, including in particular computer-readable media (but excluding mere propagated signals). The storage medium which is configured may be in particular a removable storage medium 114 such as a CD, DVD, or flash memory. A general-purpose memory, which may be removable or not, and may be volatile or not, can be configured into an embodiment using items such as virtual names 208, domain credentials 136, and a domainless authentication subsystem 206 code, in the form of data 118 and instructions 116, read from a removable medium 114 and/or another source such as a network connection, to form a configured medium. The configured medium 112 is capable of causing a computer system to perform technical process steps for optimizations of domain membership as disclosed herein. The Figures thus help illustrate configured storage media embodiments and process embodiments, as well as system and process embodiments. In particular, any of the process steps illustrated in FIG. 4, FIG. 5, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived from internal StorSimple® NAS documentation (mark of Microsoft Corporation). StorSimple® products and services include and/or utilize software implemented by Microsoft Corporation. Aspects of the StorSimple® products and services and/or their documentation are consistent with or otherwise illustrate aspects of the embodiments described herein. However, it will be understood that StorSimple® offering documentation and/or implementation choices do not necessarily constrain the scope of such embodiments, and likewise that StorSimple® software and its documentation contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

In one example, a technology feature taught herein supports domain joining by cluster names where the machines that are part of the cluster infrastructure are not domain joined but can reach a domain controller for a particular security domain. In such a setting the technology feature also supports incoming Kerberos authentication to cluster names that often represent file servers but may also represent other computational resources in a cloud environment or other networked environment.

This technology feature can make possible product and service features that offer one or more of the following: a unified block and file turn-key storage and/or web optimization appliance, a variety of access protocols, cloud-backup and cloud-based DR for mission-critical and/or other applications. For instance, StorSimple® vNext NAS products and services may be enhanced to include an implementation of technology features taught herein.

In some examples, one can create a cluster out of machines that are not security domain joined but can reach a security domain controller. In some, one can create cluster names that are domain joined to a single security domain on such a cluster. In some, one can connect to the cluster names through WMI and Kerberos authenticate to them as server endpoints. In some, one can access these cluster names as file servers through the SMB protocol.

As to implementation, one of skill will acknowledge that a conventional Kerberos security package does not support incoming authentication on a cluster server name hosted on a machine that is not joined to a security domain. However, with code changes this support is possible and—now that the teachings herein show motivation for it—can be implemented in due course. It may happen that quirks in the Kerberos security package encountered during such implementation would lead to additional changes in the server side of SMB. Changes in SRV, for example, are also feasible. With regard to multiple authoritative DNS servers, if a fileserver depends on public IPs across multiple networks then updates originating on different networks targeting different DNS servers can overwrite one another. Accordingly, implementers may benefit from understanding how node IPs are registered in such a scenario. Clusters may call an interface to perform VIP registration, or use other logic to support the scenario. The feature to create the domainless cluster and a domain joined cluster name may be exposed through a create management point API.

In some examples, cluster names are cluster resources that can be enumerated, added, modified or removed through cluster management capabilities.

In some, logging is done to clusapi logs or other logs on the client and to cluster logs on the server.

In some examples, the cluster file server will be represented by a cluster resource of type Network Name. This resource represents a server name that integrates with Active Directory® functionality as a computer object, registers a set of cluster IP addresses in DNS for name discovery, plumbs a server's domain credentials with the Kerberos security package and registers a name with server service (SRV). Such a server name can be discovered by clients, can be authenticated by Kerberos, and can act as a file server endpoint.

Figure 6:
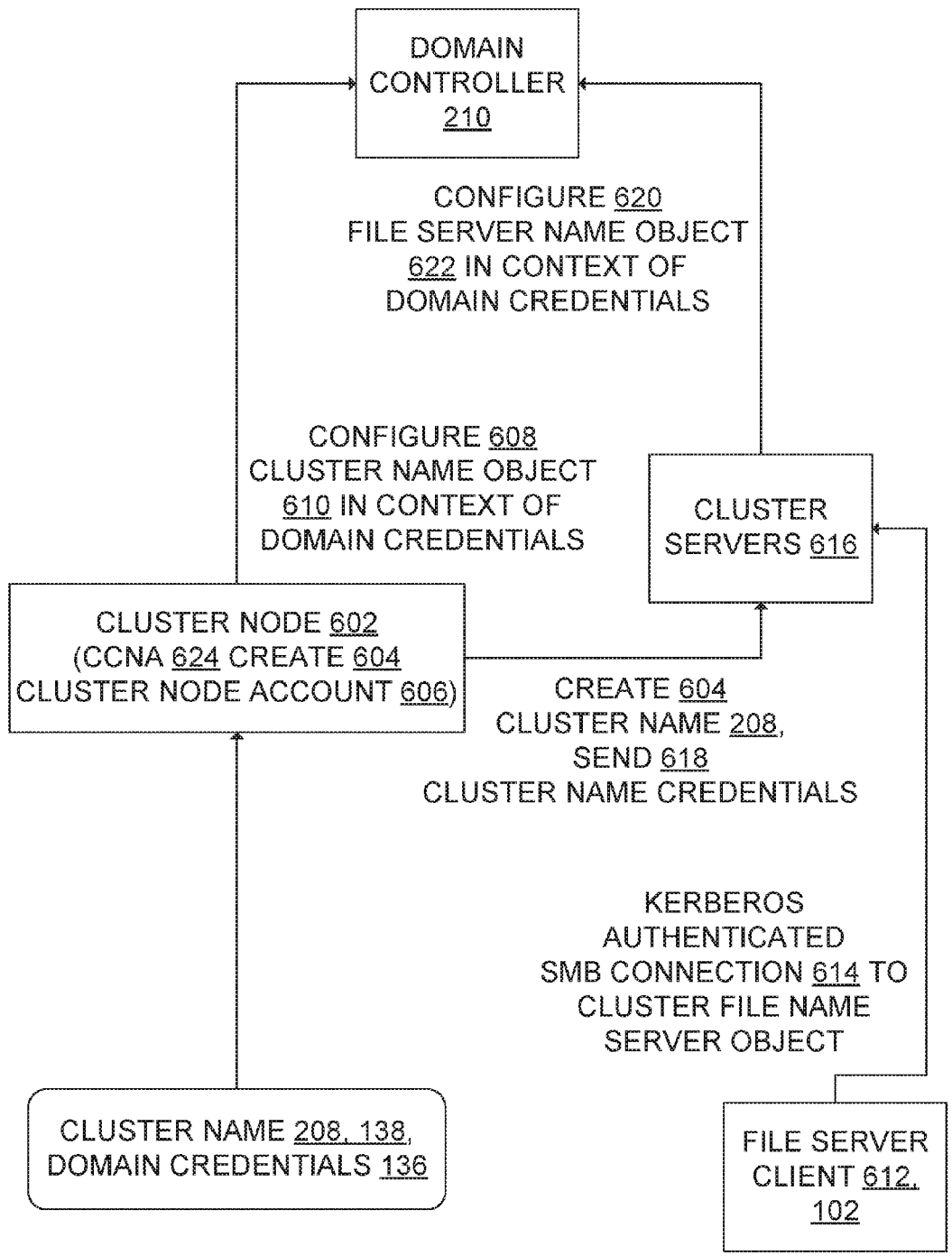
FIG. 6 is a data flow diagram illustrating aspects of creating domainless machines using domain joined virtual names in an example architecture.

The diagram in FIG. 6 represents a high level view of some technology features taught herein. In this example, CCNA 624 runs on one of the cluster machines 602 because there is no cluster name 208 yet. Input to this CCNA logic is the proposed cluster name and a set of domain credentials 136 (e.g., user name, password of that user, and domain name). CCNA logic impersonates 608 the domain credentials and creates 604 a computer object (CNO) 610 for the cluster name in AD in a cluster node account 606. It also generates a random password and sets it on the CNO. Various attributes like Service Principal Names (SPNs), DnsHostName and Supported Encryption Types are also set. CCNA then opens a handle to the cluster using a NULL name (in the caller's context), then creates 604 a Cluster Name resource through a cluster API, sets its private properties, and passes 618 the AD-related configuration data like password, creating a DC and object GUID associated to the resource. The Cluster Name resource is initially created in Cluster Group. CCNA also passes in the domain name for the cluster (which it received as input) to the server side by writing the domain name value in the cluster database.

Note that in this example no provider IP information is passed to CCNA. The workflow only deals with provisioning a cluster name in AD and creating its associated cluster resource. Any IP dependency is set outside of this workflow. Similarly, the Cluster Name resource won't be brought online during the workflow.

Continuing the example, assume the IP dependency is set correctly and the Cluster Name has onlined at least once. Whenever a file server needs to be created a new cluster resource object will be created for it. During the online of the resource, the cluster name will be impersonated 620 (with its user name, domain name and password) and a computer object 622 will be created for it in AD. All AD operations on the file server object will be performed in the context of the cluster name. At the end of online the file server name is completely integrated with AD and can serve as a Kerberos server endpoint. Since the underlying OS is not domain joined, the LOCALSYSTEM logon sessions on the box will not have domain credentials. This would have caused incoming Kerberos authentication 614 to fail, but the Kerberos security package is enhanced to decrypt incoming service tickets with a password known to both the domain and to the server itself. (Note that when the underlying OS is domain joined to the same domain as the AD server, Kerberos already exhibited the correct decrypt behavior prior to this enhancement). This password is the VCO password that will be plumbed as an extra credential to the LOCALSYSTEM logon session. Also, to have the SMB server side security handle refreshed with cluster name credentials, a control will be sent to the server service when the CNO credentials are plumbed for the first time. Server service will refresh its security handle upon receipt of this control. Some examples include the step/act of failing to authenticate an incoming Kerberos authentication at the computer with the virtual name, followed by then using the new extension to authenticate as the virtual name computer account for a different domain.

In some examples, a cluster name will be present—that is, anonymous clusters are not involved. In some, VCOs will be self-managed once a cluster name is bootstrapped. In some, DNS registration for file server names will happen in the CNO context. In some, Netname can now depend on a resource of type Disjoint IP Address. In some, file server names will be registered with SMB multichannel.

In some examples, although CSV is not the backing store for the file server in this model, a Distributed Network Name (DNN) in isolation may be created and used as a Kerberos server. DNNs will not be blocked.

In some examples, CCNA will be a clusapi call that will be called from a new PS cmdlet. It is the caller's responsibility to make sure that it runs on one of the cluster nodes. In some, there will be no changes to the cluster UI framework. In some, CNO repair will not be supported. In some, all netnames will be targeting a single domain. Changing the domain will not be supported as a single workflow by the cluster, but may be performed outside the primary workflow of the technology features focused on herein. In some examples, cluster AD validation will not be supported in this mode. Similarly, file server and NTFS on-going operational aspects like authorization and ACLing are outside the scope of this technology feature's primary focus. For instance, setting SIDs on a file for access control will be done outside the primary workflow, which is concerned with forming the cluster initially and making it initially available, as opposed to on-going operation with the published cluster name.

In some examples, SMB aliasing support will be turned off. Currently the VIP is added as an alias for the netname. Since multiple netnames will be added with the same VIP, aliases cannot be disambiguated. In some, SMB server side security handle will be refreshed exactly once after cluster credentials have been added.

In some examples, any user connecting to such a domainless file server from outside the box will not get local admin access to the box. The appliance will be locked down to prevent any changes to its local administrators group. The built in administrator user will also be disabled as to remote login.

Figure 7:
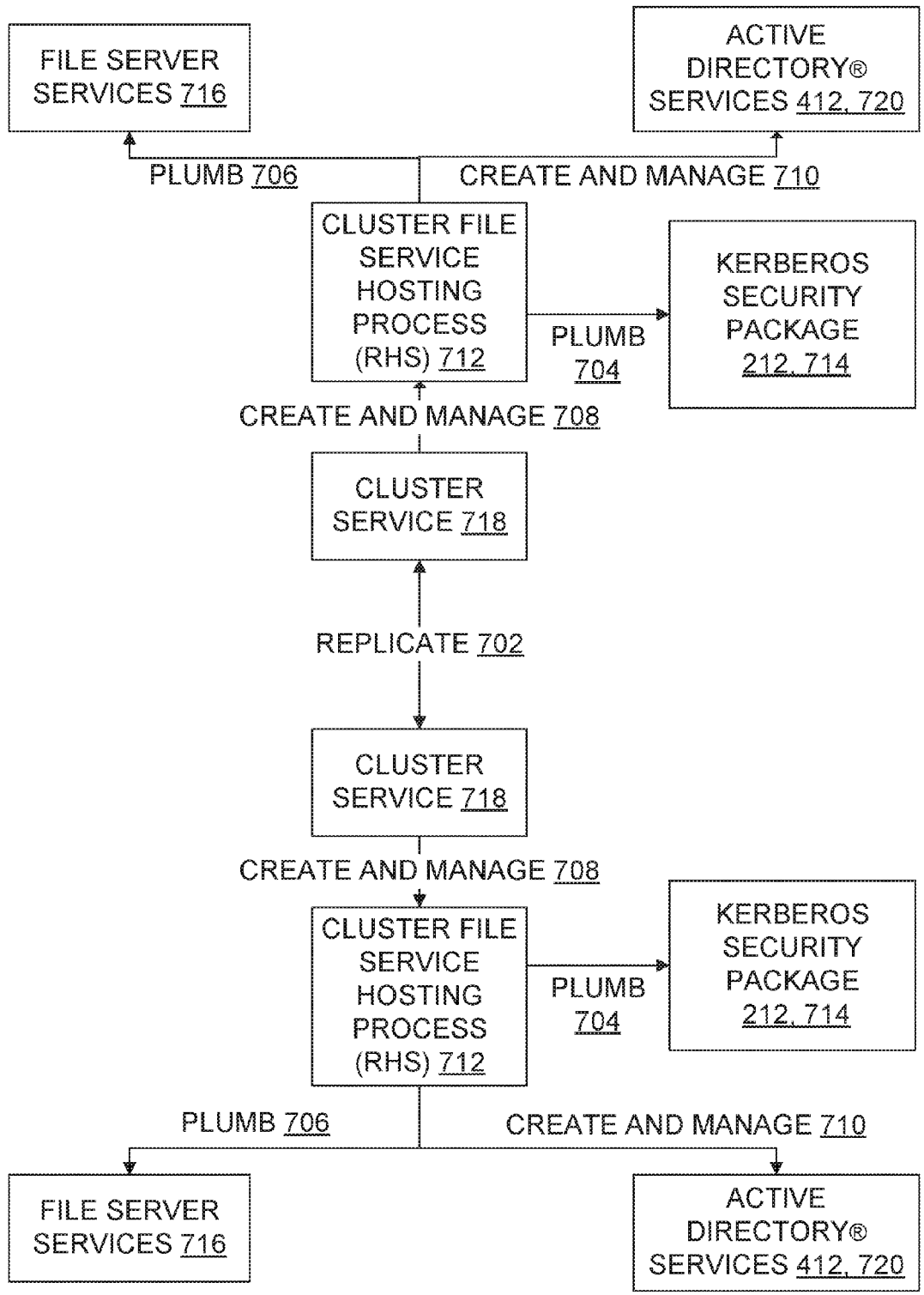
FIG. 7 is a data flow diagram illustrating aspects of a replicated cluster which contains domainless machines available through domain joined virtual names.

FIG. 7 depicts a view of the cluster server side of this technological feature. In FIG. 7, replicate 702 refers to replication of a cluster configuration over an unauthenticated connection. Plumb 704 refers to an RHS 712 plumbing enhanced Kerberos code 714 (or a functional equivalent 212) for cluster file credentials, while plumb 706 refers to plumbing file server services 716 for the cluster file namespace. Create and manage 708 refers to a cluster service 718 creating and managing the RHS (or functional equivalent), while create and manage 710 refers to RHS creating and managing the cluster file server account.

As to some examples which are consistent with the diagram of FIG. 7, the following observations are offered. Cluster service is running as a Win32 service in LOCALSYSTEM context on a domainless server that can reach a domain controller. It communicates with other nodes in the cluster through a TCP connection. It creates and manages an RHS process that hosts the network name resource (CNO and VCOs). This process also runs as LOCALSYSTEM. The network name resource does plumbing with the following services: an Active Directory® service 720 to create and manage the computer object for the cluster network names, a Kerberos security package 714 to add and remove network name credentials with this package, and a File Server service 716 to create and manage a SMB server endpoint with the server service. In this example, the interface details of a network name under Windows Server® technology (mark of Microsoft Corporation) does not change for this technological feature. In this example, the connection between cluster service instances is unauthenticated. In this example, all traffic is unsecured as environmental security is assumed.

In some examples with a Create Management Point API, a Create Cluster Name Account API will look like the following:

```
DWORD
WINAPI
CreateClusterNameAccount(
    _In_ PCREATE_CLUSTER_NAME_ACCOUNT pConfig,
    _In_opt_ PCLUSTER_SETUP_PROGRESS_CALLBACK
pfnProgressCallback,
    _In_opt_ PVOID     pvCallbackArg
);
typedef DWORD
(WINAPI * PCLUSAPI_CREATE_CLUSTER_NAME_ACCOUNT)(
    _In_ PCREATE_CLUSTER_NAME_ACCOUNT pConfig,
    _In_opt_ PCLUSTER_SETUP_PROGRESS_CALLBACK
pfnProgressCallback,
    _In_opt_ PVOID     pvCallbackArg
);
```

The input parameter to the API will be the following structure:

```
typedef struct _CREATE_CLUSTER_NAME_ACCOUNT
{
    DWORD           dwVersion;
    PCWSTR          lpszClusterName;
    DWORD           dwFlags;
    PCWSTR          pszUserName;
    PCWSTR          pszPassword;
    PCWSTR          pszDomain;
} CREATE_CLUSTER_NAME_ACCOUNT,
*PCREATE_CLUSTER_NAME_ACCOUNT;
```

The following validation checks will be done inside the API. Failure of any of these will return ERROR_INVALID_PARAMETER:

dwVersion must be greater than CLUSAPI_VERSION_WINDOWSBLUE.

dwFlags does not contain any value. It must be set be initialized to 0.

lpszClusterName must not be NULL or empty.

pszUserName, pszPassword and pszDomain all must be NULL OR they all must be non NULL.

If the Cluster Name resource already exists in the cluster then ERROR_ALREADY_EXISTS is returned.

Continuing this example, Create Cluster Name Account discovers a domain controller and then impersonates the passed in domain user credentials for the following operations: Create a computer object; Set its properties including password, SPNs, DnsHostName and encryption types. The logon and subsequent impersonation is done through two calls: LogonUserExExW, which returns a token, ImpersonateLoggedOnUser that takes in a token. Reverting to the original context is done via RevertToSelf. If no domain credentials are passed in then the AD operations are performed in the caller's context. Any errors are returned as is.

In this example, any errors in logon and impersonation are fatal failures in create cluster name account and will be logged in the cluster API log. All other operations involved in create cluster name account are run in the context of the original user who launched the API. In one StorSimple® NAS scenario this is a local administrator user. pszDomain is passed as is to the cluster nodes and is written as a REG_SZ value in the cluster database under HKLM\Cluster. The name of the netname resource will be Cluster Name. The cluster management point is set to CLUSTER_MGMT_POINT_TYPE_CNO.

As to resource dependencies, after creating a cluster name account the cluster will have Cluster Group with Cluster Name. However the name needs an IP resource provider to come online. StorSimple® NAS technology will use the HCS Vnic Resource, which is of type IPv6 Address as the provider of Cluster Name. However the adapter hosting the IP will have dynamic DNS registration turned off on both nodes so that Cluster Name does not register the IP in DNS. StatusDNS private property of Cluster name will be ERROR_SUCCESS. If an entry for the cluster name to the IP is added to the hostfile on both nodes in the appliance then the cluster name can be resolved internally. The HCIS Vnic Resource is currently in HCS Cluster Group. For the Cluster Name resource to depend on it, the former can be moved into Cluster Group; there are no existing dependencies for the IP, so the change resource group should not be problematic.

In this example, the following PS commands help turn off dynamic DNS on an adapter:

```
$na=Get-WMIObject Win32_NetworkAdapter -filter "NetConnectionID = '<Adapter Friendly Name>'"
$config=$na.Getrelated('Win32_NetworkAdapterConfiguration')
$config|%{$_.SetDynamicDNSRegistration($false,$false)}
```

StorSimple® code takes one or more public static VIPs for each fileserver. Those IPs will be on adapters that have valid DNS server configurations and have dynamic DNS set to ON. The choice of which networks to present for file server configuration and how to exactly gather this information is left to StorSimple® software or the other cluster user software. The Cluster Name could be created on demand when the very first file server needs to be provisioned. The name is created, its IP dependency set and then the group is onlined before handling the file server creation. In this example, health detection of the VIPs are built in to the resources themselves. However since they are all in the same group failure of one VIP due to network issues might cause the group to failover. To mitigate this behavior RestartAction on the VIPs can be set to ClusterResourceRestartNoNotify. The resource restart threshold could also be increased.

This example includes a Powershell cmdlet, having the following signature:

```
New-ClusterNameAccount [-Name] <string> [-UserName] <string>
[-Password]
<string> [-DomainName] <string> [<CommonParameters>]
```

As to netname enumeration of provider IPs, a singleton netname resource does not consider any provider resource types outside of IP Address, IPv6 Address and IPv6 Tunnel Address. Failure to find any of the above types as provider resources fails the netname online. The online would be modified to allow resources of types Disjoint IP Address and if such a type is found to look for the right private properties of the resource that contain the IP information.

As to netname tokens, in this example the VCO operations initiated in the context of the CNO use a logon token for the CNO. In a system using software known colloquially as Blue, or "Windows Blue", this token was obtained through a call to LogonUserExExW API with the logon type specified to NetworkClearText. However in a domainless environment the call will fail because the local machine has no domain credentials. Instead the logon type from here onwards will be set to NewCredentials. This will cause local accesses to still use domainless credentials but remote accesses (in this case the ones targeting Active Directory® functionality in the CNO context) will use the passed in CNO credentials. This change will apply to both the domainless and the mainstream domain joined environments. Note the LOGON32_LOGON_NEW CREDENTIALS parameter below:

```
LogonUserExExW( user_.c_str( ),
  domain_.c_str( ),
  pwd,
  LOGON32_LOGON_NEW_CREDENTIALS,
  LOGON32_PROVIDER_DEFAULT,
  NULL,
  &token,
  NULL, NULL, NULL, NULL )
```

As to getting an Active Directory® domain, the AD domain is stored under HKLM\Cluster. Whenever netnames need to use the domain name, the following steps occur on the node: First, call DsRoleGetPrimaryDomainInformation to retrieve machine role. Second, if the machine is stand-alone then check AdminAccessPoint value under HKLM\Cluster. If it is not CLUSTER_MGMT_POINT_TYPE_CNO then throw an exception ERROR_INVALID_DATA, else read value from cluster database. If the value does not exist then throw ERROR_FILE_NOT_FOUND, else use that value for AD domain.

As to integration, Server service maintains a global credentials handle used for authenticating all incoming connections. In a domainless environment this handle is to be refreshed to pick up cluster netname's credentials whenever they are added to the Kerberos security package. However this refresh needs to happen only once per reboot after the first set of credentials have been added. So netname will notify SRV locally through FSCTL_SRV_REFRESH_CRED_HANDLE. The FSCTL will be handled in srv2. The implementation will close Smb2ExtensibleCredentialHandle and call InitializeSecurityContext to refresh the handle.

As to changes in Kerberos security package, the familiar Kerberos security package does not decrypt incoming service tickets in a domainless environment. A change taught here is an enhancement, to allow decryption when the LOCALSYSTEM logon session has extra credentials, which are plumbed by the network name resource. Function KerbCreateCredential in credmgr.cxx will be changed to accommodate this scenario. The old logic failed auth with SEC_E_NO_CREDENTIALS. But the new logic will force auth by explicitly checking for ExtraCredentials.Count; note the use of that variable below:

```
if (((LogonSessionFlags & (KERB_LOGON_NO_PASSWORD |
  KERB_LOGON_LOCAL_ONLY) ) != 0) &&   !LogonSession-
  >ExtraCredentials.Count)
```

As to turning off aliasing and admin shares, aliasing and admin share creation are to be turned off in the StorSimple® NAS scenario. However, a general domainless environment with the ability to join netnames to a domain should not necessarily control aliasing and admin share behavior. So turning on/off these behaviors is configurable in some embodiments. Instead of exposing private properties through the netname resource, StorSimple® software would set values AliasingOff and AdminShareCreationOff under HKLM\Cluster directly through cluster database API ClusterRegSetValue. A value of 1 will indicate that the behavior will be turned off. These settings are cluster wide and affect every netname resource in the cluster. There is presently no way to turn these on/off for specific netnames as there are presently no requirements to do so, but this may differ in other embodiments. Singleton netname resource in its online will read the cluster database and perform the correct action as per the value. Distributed network names will perform these operations in NNDistributedResource::StartupClone method.

As to some performance considerations, a total of up to three GUMs is possible with the changes described here: One for setting domain name, one for aliasing behavior and the third for admin share behavior. However these are one time configuration changes during the lifetime of the cluster and should not affect steady state. Also, SRV locks accesses to its global credential handle because it can now be refreshed by the cluster. The handle is locked for exclusive access during refresh and for shared access during usage in AcceptSecurityContext.

As to possible upgrades, a management point may be added to some examples. Then an AD integrated cluster name account can be created on the cluster.

Some Additional Combinations and Variations

Any of these combinations of code, data structures, logic, components, signals, signal timings, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIG. 5 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Two different reference numerals may be used in reference to a given item in some cases, when one of the numerals designates a particular subset of a broader group that is designated by the other numeral. For example, a first reference numeral may designate services generally while a second reference numeral designates a particular service, or a first reference numeral may designate a category of items while a second reference numeral designates a particular item in that category. Thus, as one example, in the discussion above the reference numeral 212 designates domain controller authentication subsystems generally while the reference numeral 714 designates a Kerberos security package, which is a particular kind of domain controller authentication subsystem. So FIG. 7 does not err in referring to the Kerberos security package with both reference numerals, 212 and 714.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a technical process for authenticating with cross-domain trust, the process comprising:

obtaining a first set of security domain credentials for a first security domain;

obtaining a first virtual name for a first computer account in an authenticating operating environment, the first virtual name distinct from any other virtual name for the authenticating operating environment which is recognized by the authenticating operating environment, the first virtual name also distinct from any computer name for the authenticating operating environment which is recognized by the authenticating operating environment, the authenticating operating environment comprising at least a logical processor and a memory in operable communication with each other;

obtaining a first secret corresponding to the first virtual name;

authenticating the authenticating operating environment to the first security domain as the computer account using the first set of security domain credentials, the first virtual name, and a proof of knowledge of the first secret; and authenticating the authenticating operating environment to a second security domain which is distinct from the first security domain, whereby the authenticating operating environment is concurrently authenticated as a member in each of the two security domains.

2. The computer-readable storage medium of claim 1, wherein the first security domain is distinct from the second security domain in at least one of the following ways:
different security credentials are permitted for membership in the respective security domains,
different security credentials are required for membership in the respective security domains, or
different security credentials are prohibited for membership in the respective security domains.

3. The computer-readable storage medium of claim 1, wherein the first security domain and second security domain have no pre-existing trust relationship.

4. The computer-readable storage medium of claim 1, wherein the authenticating operating environment is further authenticated to a third security domain using a third set of security domain credentials, a third virtual name, and a third proof of knowledge of a third secret, the third set of security domain credentials being for the third security domain, the third virtual name distinct from any other virtual name for the authenticating operating environment, the third virtual name also distinct from any computer name for the authenticating operating environment, and the third secret corresponding to the third virtual name.

5. The computer-readable storage medium of claim 1, wherein at least one of the security domains performs authentication using a ticket-based authentication protocol.

6. The computer-readable storage medium of claim 1, wherein the process further comprises making the first virtual name available through an IP-based network as a connection endpoint for highly available file server services.

7. A technical process for authenticating a domainless computing system to a first security domain as a first computer account in an authenticating operating environment, the domainless computing system comprising at least a logical processor and a memory in operable communication with each other, the process comprising:
obtaining a first set of security domain credentials for the first security domain, the domainless computing system not being joined as a member of the first security domain;
obtaining a first virtual name for the first computer account, the first virtual name distinct from any other virtual name for the authenticating operating environment which is recognized by the authenticating operating environment, the first virtual name also distinct from any computer name for the authenticating operating environment which is recognized by the authenticating operating environment;
obtaining a first secret corresponding to the first virtual name; and
authenticating the domainless computing system to the first security domain, at least in part by operation of the logical processor, as the computer account using the first set of security domain credentials, the first virtual name, and a proof of knowledge of the first secret, whereby the domainless computing system authenticates to the first security domain with cross-domain trust by impersonating a first security domain member without joining the first security domain.

8. The process of claim 7, wherein authenticating comprises at least one of the following: selecting from one or more computer accounts, selecting from one or more security groups, or selecting from one or more user accounts.

9. The process of claim 7, wherein authenticating comprises accepting one or more non-passwords as the proof of knowledge of the first secret.

10. The process of claim 7, wherein authenticating comprises using public key cryptography.

11. The process of claim 7, wherein authenticating comprises using a ticket-based authentication protocol.

12. The process of claim 7, wherein authenticating comprises operating in at least one of the following: a cloud computing environment, a cloud storage environment.

13. An apparatus in an authenticating operating environment, the apparatus comprising:
at least one processor;
at least one memory in operable communication with at least one processor;
an authentication subsystem which includes software executable by at least one processor using at least one memory to (a) obtain a first set of security domain credentials for a first security domain, (b) obtain a first virtual name for a first computer account, the first virtual name distinct from any other virtual name for the authenticating operating environment which is recognized by the authenticating operating environment, the first virtual name also distinct from any computer name for the authenticating operating environment which is recognized by the authenticating operating environment, (c) obtain a first secret corresponding to the first virtual name, and (d) authenticate the apparatus to the first security domain as the computer account using the first set of security domain credentials, the first virtual name, and a proof of knowledge of the first secret; and
wherein the apparatus is configured for cross-domain trust in at least one of the following ways:
the authentication subsystem comprises a domainless authentication subsystem; or
the authentication subsystem includes software executable to authenticate the apparatus to a second security domain which differs from the first security domain as to one or more of: security domain controller, security credentials, or security domain members.

14. The apparatus of claim 13, wherein the apparatus comprises a multiprocessor computer system.

15. The apparatus of claim 13, wherein the authentication subsystem resides on an individual machine, and the first virtual name names the individual machine.

16. The apparatus of claim 13, wherein the first virtual name is tied to a user's credentials.

17. The apparatus of claim 13, wherein the authentication subsystem software is embedded software, the first virtual name names a node of the apparatus, and the node is in an Internet of Things.

18. The apparatus of claim 13, wherein the apparatus comprises a network-attached storage product.

19. The apparatus of claim 13, wherein the authentication subsystem comprises a domainless authentication subsystem which generated the first secret.

20. The apparatus of claim 13, wherein the authenticating operating environment comprises a network connection in which traffic is unsecured and environmental security is assumed.

* * * * *